United States Patent [19]

Le Devehat

[11] Patent Number: 4,899,776

[45] Date of Patent: Feb. 13, 1990

[54] METHOD AND APPARATUS FOR EMERGENCY DISCONNECTION OF A FLUID PETROLEUM PRODUCT TRANSFER ARM

[75] Inventor: Eugene Le Devehat, Saligny, France

[73] Assignee: FMC Corporation, Chicago, Ill.

[21] Appl. No: 292,607

[22] Filed: Dec. 30, 1988

[30] Foreign Application Priority Data

Dec. 30, 1987 [FR] France ............................... 87 18409

[51] Int. Cl.[4] .............................................. F16L 55/18

[52] U.S. Cl. ...................................... 137/15; 137/615; 15/104.062; 15/3.51

[58] Field of Search .......................... 15/3.51, 104.062; 137/15, 615; 141/387, 279

[56] References Cited

U.S. PATENT DOCUMENTS

| | | | |
|---|---|---|---|
| 2,948,143 | 8/1960 | Pruitt | 15/3.51 |
| 3,322,140 | 5/1967 | Scott | 15/104.062 |
| 3,541,837 | 11/1970 | Davis et al. | 15/104.062 |
| 3,779,270 | 12/1973 | Davis | 15/104.062 |
| 4,199,834 | 4/1980 | Muchow et al. | 15/104.062 |
| 4,416,306 | 11/1983 | Le Devehat | 137/615 |
| 4,441,522 | 4/1984 | Griffin | 137/580 |

*Primary Examiner*—A. Michael Chambers
*Attorney, Agent, or Firm*—W. W. Ritt, Jr.; R. B. Megley

[57] ABSTRACT

A method and apparatus for effecting emergency disconnection of a fluid transfer arm from a marine tanker manifold or other vessel to which the arm is connected, including means to purge the arm of fluid prior to disconnection in order to prevent fluid spillage.

15 Claims, 8 Drawing Sheets

141
8'

153
10'
151
150
7'
11'

METHOD AND APPARATUS FOR EMERGENCY DISCONNECTION OF A FLUID PETROLEUM PRODUCT TRANSFER ARM

BACKGROUND OF THE INVENTION

This invention concerns fluid loading/unloading arms used to transfer petroleum products between two pipelines, one mobile and the other immobile, that are mounted, respectively, on a ship and a quay. More particularly, the invention is concerned with emergency disconnection of such fluid loading/unloading arms.

Fluid loading/unloading arms comprise a fixed and generally upright tubular portion, usually called a riser, adapted to be mounted on a quay and connected to an immobile pipeline, and a maneuverable mobile tubular portion pivotally connected to this fixed tubular portion by a rotary pipe joint, the mobile portion comprising two pipes or tubes connected end-to-end in an articulated manner by rotary pipe joints and ending with a coupling device adapted for connection of the arm to a marine tanker manifold or other mobile pipeline.

Associated with the mobile tubular portion is a static balancing system usually employing a counterweight, adapted to enable the arm, when empty, to remain stable in any configuration. This is necessary for proper execution of the operations to couple or uncouple the arm from the mobile pipeline without having to apply significant force to hold the arm in position.

During loading/unloading operations the ship carrying the mobile pipeline is moored to the quay to which the fixed pipeline leads, and the deformable or maneuverable nature of the arm's mobile portion serves to compensate for low amplitude movements between the ship and the quay that are inevitable when water swells occur.

The arm's mobile portion usually comprises two straight pipe sections (approximately 10 meters long in the case of an arm with an inside diameter of 16 inches) forming an inverted vee, the angle between the sections being variable to facilitate movements with an amplitude of a few meters.

Given the risk of moorings breaking, especially in bad weather, there have already been developed, for safety reasons, emergency disconnection procedures directed to uncoupling the arm from the mobile pipeline before the arm breaks, so that the arm is protected to the greatest possible degree. Any such emergency disconnection requires purging the arm before returning it empty to an equilibrium configuration. Disconnecting the arm when full would inevitably result in uncontrolled movement of the mobile portion totally incompatible with safety requirements in respect of personnel and equipment.

It has therefore been proposed to provide a drain valve at the base of the arm's fixed portion and a "vacuum-break" valve at the apex or top of the inverted vee-shaped tubular portion for venting it to atmosphere. As soon as it is realised that the moorings have broken, the pumps employed to force fluid through the arm are stopped, a flow control valve is shut to isolate the arm from the fixed pipeline, the drain valve is opened, the vacuum-break valve is opened and the liquid contained in the arm is allowed to flow under its own weight, partly into the mobile pipeline and partly through the drain valve into an emergency storage tank. It is only after such gravity draining that disconnection is effected.

Unfortunately, the operation of these valves and the subsequent gravity draining of the arm can sometimes take too long for disconnection to be effected before the arm is damaged. These operations routinely take several minutes which, even if the ship drifts to only a very limited degree, results in an overall arm movement that is outside the arm's envelope, i.e. the arm's permissible range of safe operation. Thus, in many cases this procedure is too slow to protect the arm until disconnection takes place, expecially since there is a significant time lapse between mooring breakage and when such breakage is detected.

SUMMARY OF THE INVENTION

One object of the present invention is provision of an emergency disconnection procedure that is much faster than the known procedure, usually taking between 30 and 60 seconds or even less depending on the inside diameter of the arm (generally between 6 and 24 inches).

Another object of this invention is to provide an emergency disconnection method for petroleum product loading/unloading arms, the arms comprising a fixed tubular portion for connection to a fixed pipeline, a maneuverable mobile tubular portion equipped with a "when-empty" balancing system, and a coupling device adapted to releasably connect the maneuverable mobile portion to a mobile pipeline that is subject to fluctuations in position relative to the fixed pipeline. The method comprises shutting off the fluid flow through the arm at an upstream location in the arm, from this shut-off location purging all or virtually of the fluid contained in the maneuverable mobile portion of the arm by propelling a pig or other scraper device through the mobile portion. The use of a pig or similar expulsion member, disposed between the fluid to be expelled and the gas used to propel it, has the advantage of avoiding any mixing of the gas with the fluid product and the turbulence that would inevitably result; in this way draining the arm is fast and total.

For implementing this method the invention also provides a petroleum product loading/unloading arm comprising a fixed tubular portion or riser for connection to a fixed pipeline, a maneuverable mobile portion pivotally mounted on the riser and equipped with a system for balancing the arm when empty, a coupling device for connecting the arm to a mobile pipeline subject to fluctuations in its position relative to the fixed pipeline, a purging device located in an upstream area of the arm, for shutting off the fluid flow into the arm and for injecting a pig into the arm's mobile portion, a stop member located at a downstream area of the arm to allow fluid to flow through it and to halt movement of the pig, and a gas injection system on the downstream side of the stop member for returning the pig to the purging device.

Thus the invention overcomes the problems with the current practice of draining the loading arm by gravity, partly in the downstream direction and partly in the upstream direction. Although the disconnection procedure in accordance with the invention entails a number of operations and forced expulsion of the fluid, a significant timesaving results from this procedure.

Pigs and other types of scrapers are well known for the purpose of cleaning the inside surface of a fluid pipeline of primarily fixed configuration intended to convey sequentially one or more various liquids, and especially when changing from one kind of fluid to another. However, the present invention recognises the benefit of a pig or scraper of this kind for solving the problems of emergency disconnection of fluid loading arms despite the large number of right-angle pipe elbows that such loading arms contain, even though at first sight such use of a pig would seem incompatible with its rapid movement through the arm. The invention has also facilitated use of such pigs or scrapers in a loading arm in a way as to enable expulsion of liquid from a shut-off area without introducing any significant fluid head loss in service.

According to the present invention the features thereof may be combined or implemented separately as follows:

the purging device can be situated in the fixed tubular portion of the arm and the pig stop member situated near the coupling device;

the purging device can be situated in the upstream end of the fixed tubular portion of the arm;

the purging device can be situated near the junction between the arm's fixed and mobile tubular portions;

the purging device can be situated near the coupling device and the pig stop member situated in the fixed tubular part of the arm;

the pig stop member can be situated near the upstream side of a valve inter-connecting the arm to the fixed pipeline.

The purging device generally comprises a bylindrical housing designed for attachment to a pipe elbow or other tubular portion of the arm, a sliding sleeve-like or bushing within the housing, a fluid powered actuator mounted on the housing and with its piston rod attached to the bushing, whereby in response to the operation of the actuator the bushing can be moved between a retracted position in which it is entirely withdrawn from the elbow and an advanced position in which it shuts off the elbow, and a spherical-shaped scraper or pig that, at rest, resides in the bushing. The bushing has a perforate transverse wall, and the housing, is connected to a compressed gas supply adapted to inject compressed gas into the housing and through the perforate wall of the bushing to propel the spherical pig into and through the arm's mobile tubular position. The invention also comprises the use of sensors to indicate position of the bushing and movement of the pig into the arm's flow passage and its return therefrom.

Further objects, characteristics and advantages of the invention will become apparent from the following description thereof given by way of non-limiting example with reference to the drawings.

DESCRIPTION OF THE PREFERRED EMBODIMENTS

Figure 1:
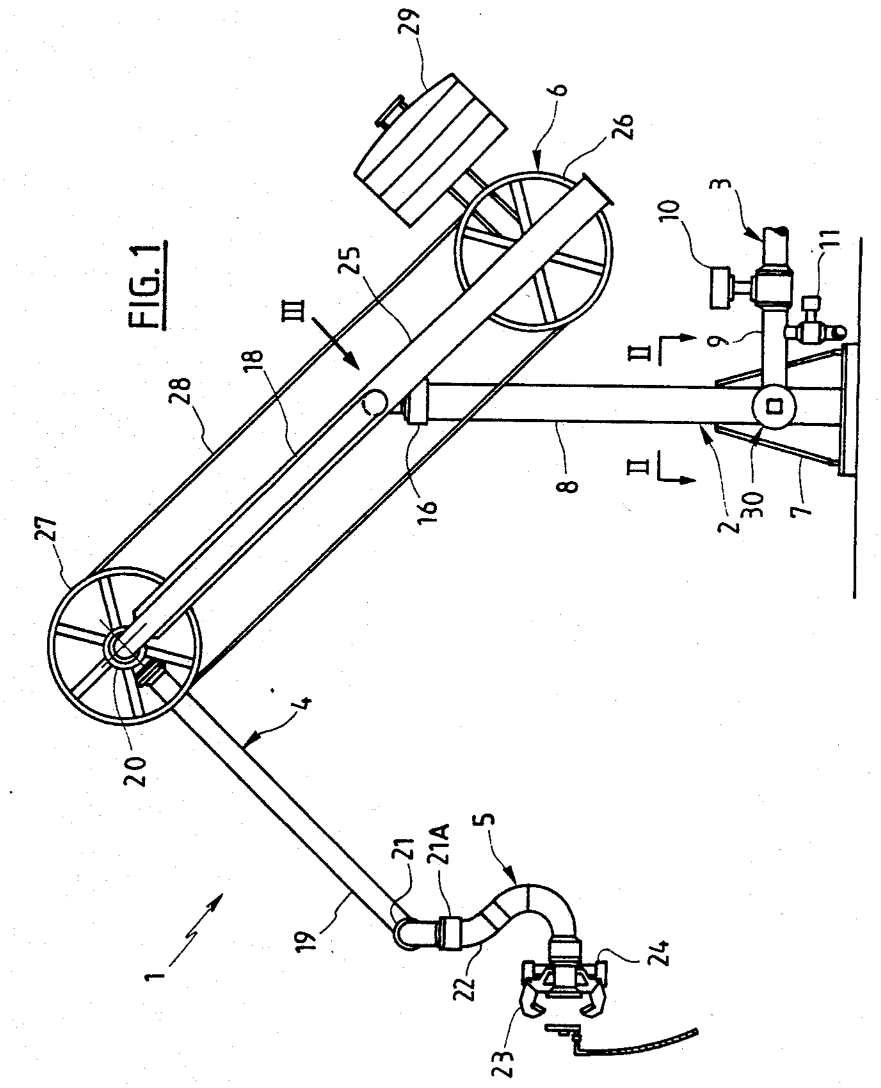
FIG. 1 is a schematic view in side elevation of a loading arm in accordance with the present invention, the arm particularly intended for loading petroleum products onto a marine vessel.

In the following description and drawings the reference numerals with primes are used to indicate the same or comparable element designated by the same numeral without a prime.

Figure 7:
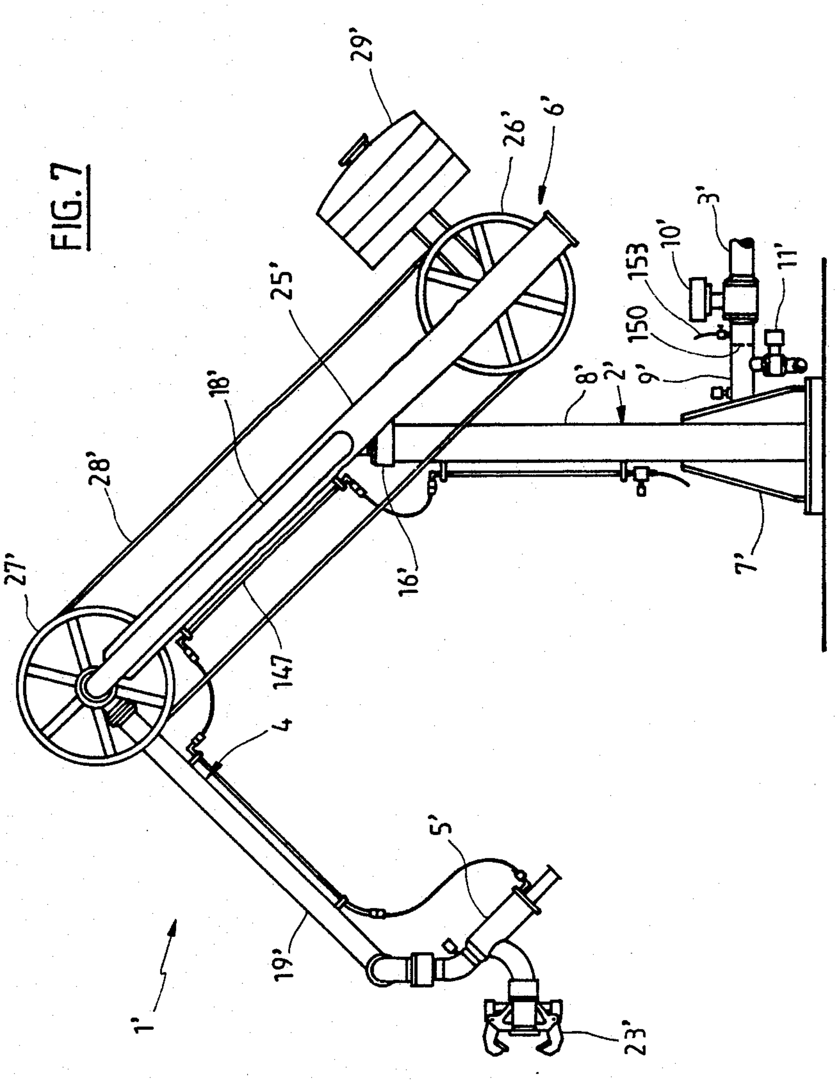
FIG. 7 is a schematic view in side elevation of an unloading arm in accordance with the present invention, this arm particularly intended for unloading petroleum products from a marine vessel.

FIGS. 1 and 7 show two loading arms 1 and 1' in accordance with the invention, differing in terms of the liquid flow direction under normal conditions of use: the arm 1 is designed for loading liquid onto a ship, provided with an appropriate pipeline, from a fixed storage tank to which the arm is permanently connected, whereas the arm 1' is intended for unloading from a ship of this kind into such a storage tank. In practice, loading arms are primarily dedicated to only one or the other of these two opposite types of fluid transfer.

Figure 2:
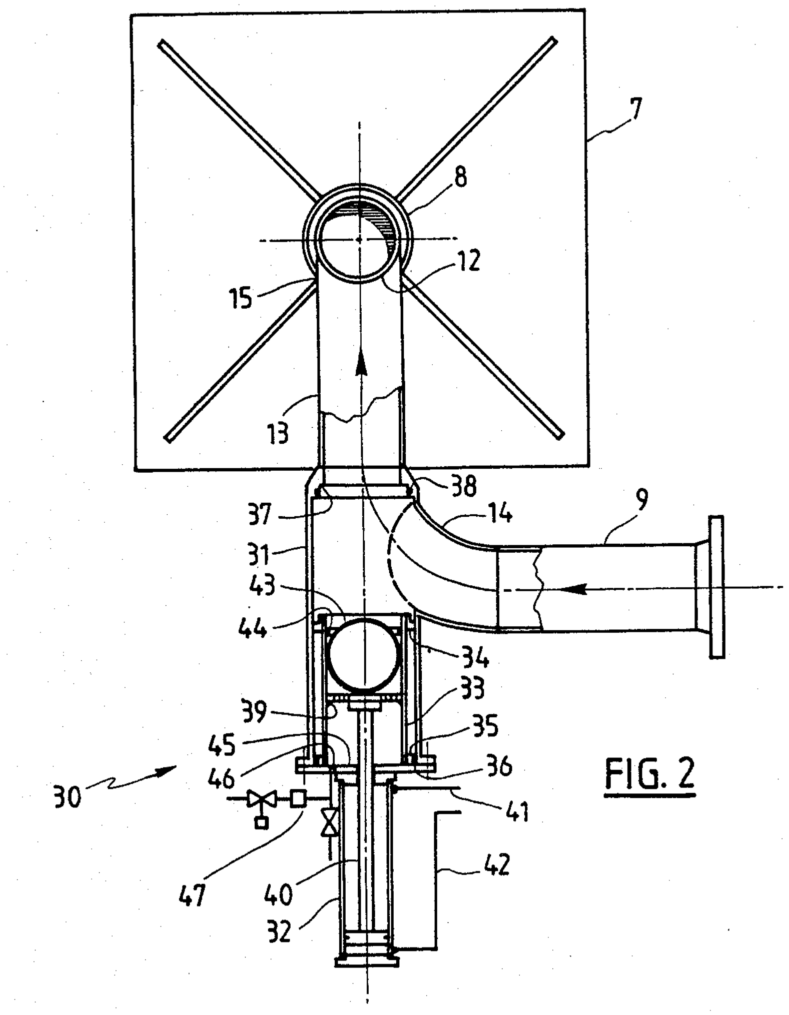
FIG. 2 is a plan view in section on the line II—II of FIG. 1, and with some parts broken away.

Referring first to FIGS. 1 and 2, a loading arm 1 of the present invention generally comprises a fixed tubular portion 2, usually called a riser, adapted to be connected to a fixed pipeline 3 leading to a storage tank (not shown), and a maneuverable mobile tubular portion 4 ending in a coupling device 5 for releasably connecting the arm to a marine tanker manifold or other mobile pipeline (not shown) that is subject to fluctuations in its position relative to the fixed pipeline 3. Associated with the arm's mobile tubular portion 4 is a balancing system 6 adapted to hold this mobile portion, when empty, in a static equilibrium position irrespective of its configuration.

The fixed tubular portion 2 comprises a horizontal pipe section 9 that is fixed to a base 7 carrying a vertical support mast 8, and that also is inter-connected to the fixed pipeline 3 by a flow control valve 10, often referred to as the arm base valve. The pipe section 9 is fitted with a branch pipe equipped with a drain valve 11, and the tubular portion 2 includes an inner vertical riser pipe section 12 inside the vertical mast 8. As seen in FIG. 2, the pipe sections 9 and 12 communicate with each other through a short transverse pipe section 13 and right-angle pipe elbows 14 and 15.

Figure 3:
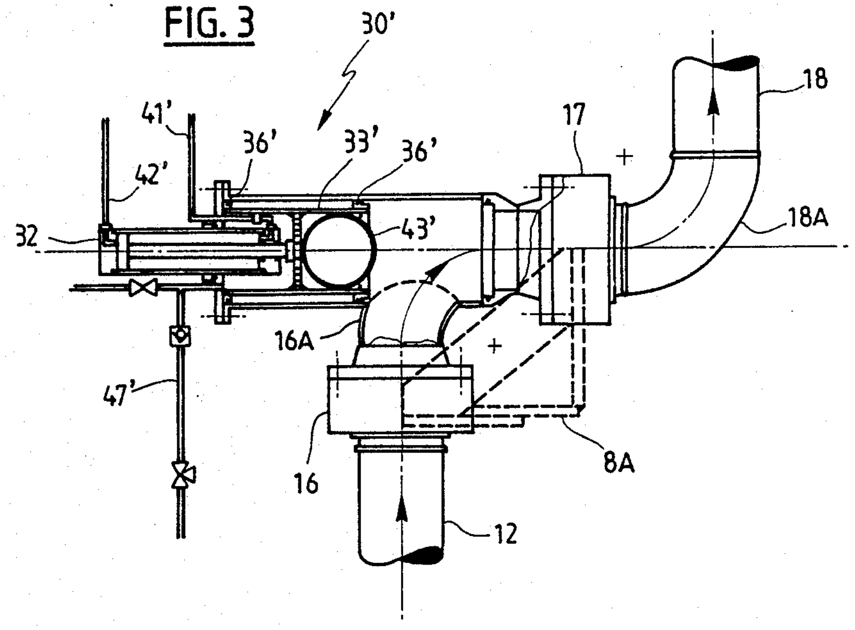
FIG. 3 is a fragmentary view of another embodiment of the loading arm of FIGS. 1 and 2, with the arm purging device located at the juncture of the riser and the mobile arm portion.

As seen in FIGS. 1 and 3, the riser pipe section 12 ends at a rotary pipe joint 16 with a vertical axis, and the pipe joint 16 is connected by a right angle pipe elbow 16A to a rotary pipe joint 17 oriented on a horizontal axis. A bracket-like support 8A, shown in phantom in FIG. 3, is secured to the outer elements of the joints 16, 17 to support the arm's mobile portion on the mast 8.

The arm's mobile portion 4 generally comprises two pipe sections 18, 19 (FIG. 1) interconnected by right angle pipe elbows (not shown) and a horizontal axis rotary pipe joint 20. The inboard pipe section 18 is rotatably connected to the pipe joint 17 through a right angle pipe elbow 18A, and the outboard pipe section 19 is connected by a right angle pipe elbow (not shown), a horizontal axis rotary pipe joint 21, another right-angle pipe elbow and a vertical axis rotary pipe joint 21A to a curved tube 22 fitted with a coupling device 23, which coupling device 23 is powered by a hydraulic motor 24.

The arm balancing system 6 is a conventional sheave and cable system comprising a beam 25 fixed to the inboard pipe section 18 and extending beyond the rotary joint 17, two horizontal axis sheaves 26, 27 that are freely rotatable relative to this beam and which are, respectively, mounted on this beam and supporting a cantilever-type counterweight 29 and mounted on the rotary pipe joint 21 and secured to the outboard pipe section 19, and a cable 28 trained around and attached to the sheaves.

In accordance with the present invention, the loading arm 1 also comprises a high-speed arm-purging device 30 disposed at an upstream position and designed to shut off fluid flow into the arm and propel the fluid contained in the arm's mobile tubular portion 4 toward the arm's coupling device 23. In FIGS. 1 and 2 this high-speed purging device is attached to the pipe elbow 14 at the base of the arm and in axial alignment with the transverse pipe section 13, whereas, in the embodiment of FIGS. 3 through 5 the purging device 30' is provided at the elbow 16A that extends from the rotary joint 16, both locations being suitable to purge fluid from the mobile tubular portion of the arm and re-establish its "when-empty" equilibrium condition. If desired, the purging device 30' could be located instead at the elbow 18A of the arm's mobile tubular portion with similar satisfactory results.

The purging device 30 generally comprises a cylindrical housing 31 attached to and opening into the elbow 14, a sleeve-like sliding bushing 33 within the housing 31, and a fluid-powered double-acting actuator 32 for sliding the bushing 31 in an axial direction. The diameter of the bushing 33 is the same as that of the transverse pipe section 13 and the remainder of the arm's tubular portions. The sliding bushing 33 has a retracted position (FIG. 2) in which it is completely withdrawn from the fluid flow in the arm, and an advanced position (33' in FIG. 5) in which it shuts off this fluid flow. The bushing 33 is slidably supported in the housing 31 by two annular liners 34, 35 and an annular sealing gasket 36. In the advanced position the forward edge of the sliding bushing (possibly together with a reduced outside diameter portion of the liner 34) resides within a cylindrical bearing surface 37 the diameter of which is between the inside diameters of the housing 31 and the transverse pipe 13. This bearing surface is preferably also provided with an annular sealing gasket 38.

The sliding bushing 33 has a perforate radial wall 39 attached to a piston rod 40 of the actuator 32. Pipes 41 and 42 connect the actuator 32 in a conventional manner to a fluid pressure source (not shown), in practice a supply of hydraulic oil under pressure. Inside the bushing 33 is a spherical scraper or pig 43 and a ring 44 adapted to retain the pig in the bushing under normal operating conditions of the arm. The cylindrical housing 31 has an end wall 45 provided with a bore 46 adapted to facilitate injection or venting of compressed nitrogen or other gas via a pipe system 47.

Figure 4:
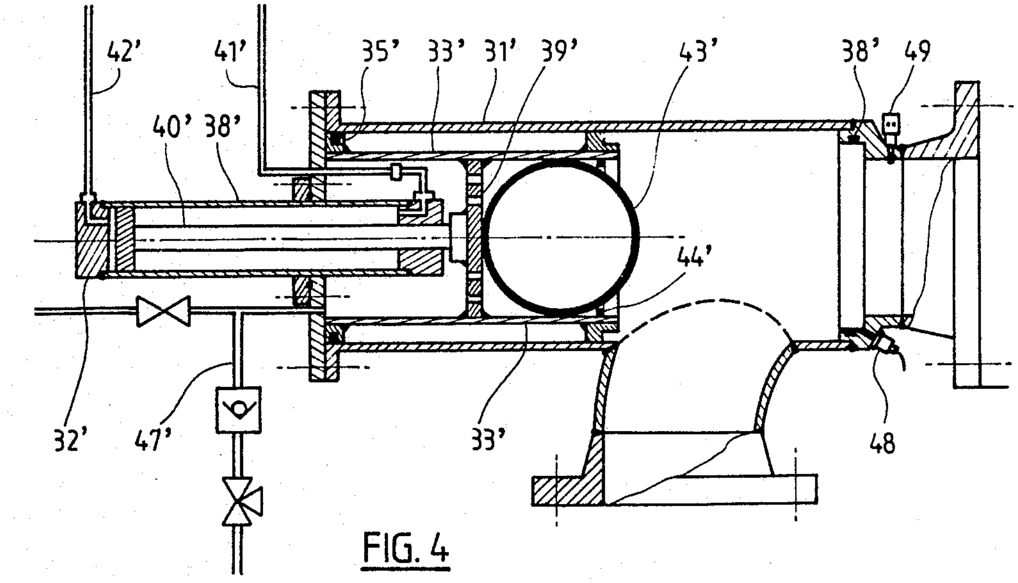
FIG. 4 is an enlarged view in axial cross-section of the purging device of FIG. 3, showing the device in its retracted position.
Figure 5:
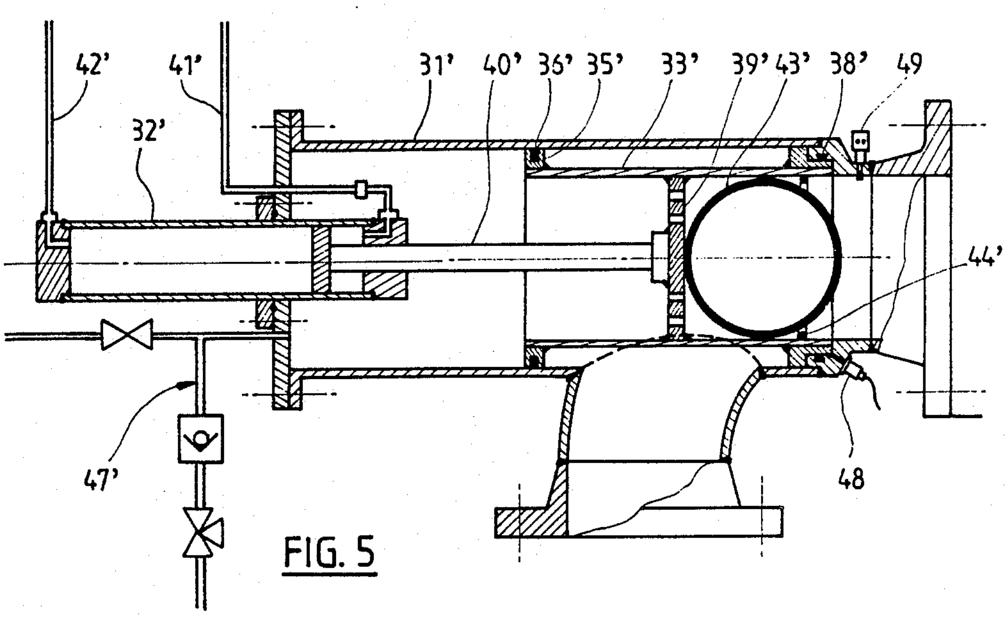
FIG. 5 is a view similar to FIG. 4, showing the device in its extended position.

As seen in FIGS. 4 and 5, detectors 48 and 49 can be included to indicate, respectively, the presence of the sliding bushing 33' in the advanced position and the passage of the pig 43' into, or return of it from, the arm's flow passage.

Initiation of the emergency disconnection procedure entails two immediately consecutive or even virtually simultaneous operations while the arm base valve 10 is being shut off. As the actuator 32 is operated to move the sliding bushing into its advanced position to shut off the fluid flow through the arm, compressed gas (at a pressure of 2 to 3 bars, for example) is injected into the housing through the pipe system 47 to cause downstream propulsion of the pig 43 and the fluid in the arm ahead of the pig with a negligible quantity of residue in the shut-off area. This expulsion of fluid from the arm does not entail any mixing of gas and fluid, and therefore no formation of gas bubbles occurs in the fluid, so that the result is highly satisfactory.

Figure 6:
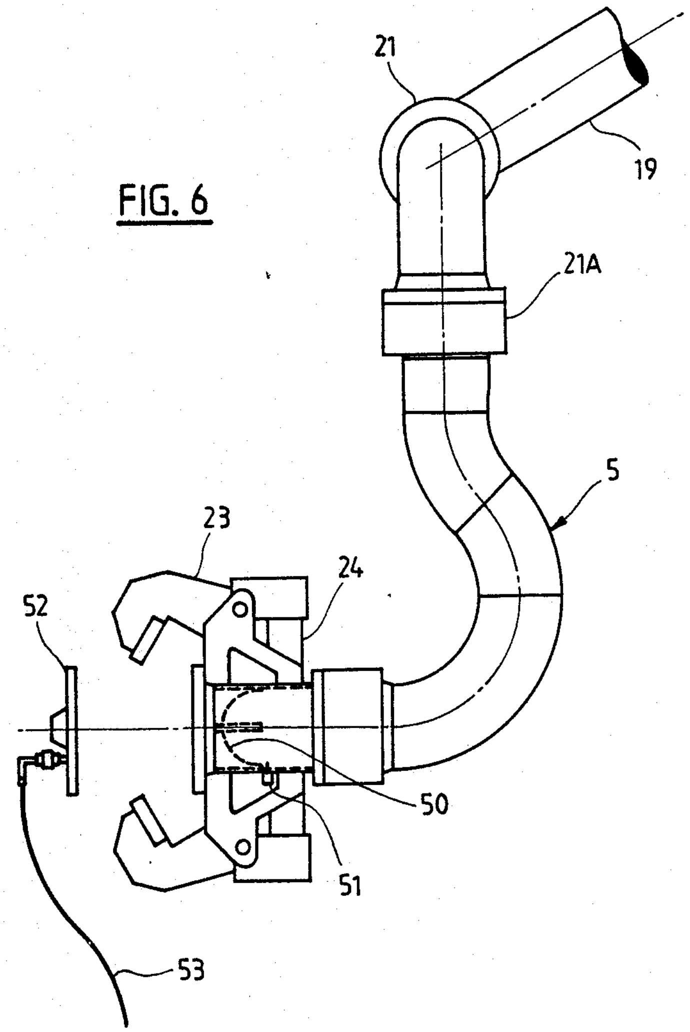
FIG. 6 is a fragmentary view of the free or outboard end of the loading arm of FIG. 2, showing in phantom the pig stop member.

The expulsion continues until the pig 43 arrives at a stop member 50 advantageously provided at the downstream end of the arm's mobile tubular portion, shown in FIG. 6 in the immediate vicinity of the coupling device 5. This stop member 50, the presence of which enables re-use of the pig, can comprise a cross-shaped element configured so as to arrest the pig along two crossed semi-circles, without introducing any significant head loss under normal fluid transfer conditions.

A pig detector 51 is advantageously provided just upstream of the stop member 50 to indicate the end of the arm purge phase. Disconnection of the coupling device 23 from the mobile pipeline (not shown) can then be effected to complete the emergency disconnection procedure. All of these operations, for a total flow passage length of approximately 25 meters, can be completed in approximately 15 seconds (speed of movement of the pig approximately 1.5 to 2 meters/s) which makes it possible to meet the overall target of a total of 30 seconds.

To return the pig to its initial position, a flange plate 52 is fitted into the coupling device and the pig is then propelled back by injecting compressed gas through a line 53 between this plate and the pig. When the detector 49 again senses the pig passing it as the pig returns into the bushing, the actuator 32 is operated to withdraw the bushing into its retracted position (FIG. 4). The arm 1 is then ready for further service.

Figure 8:
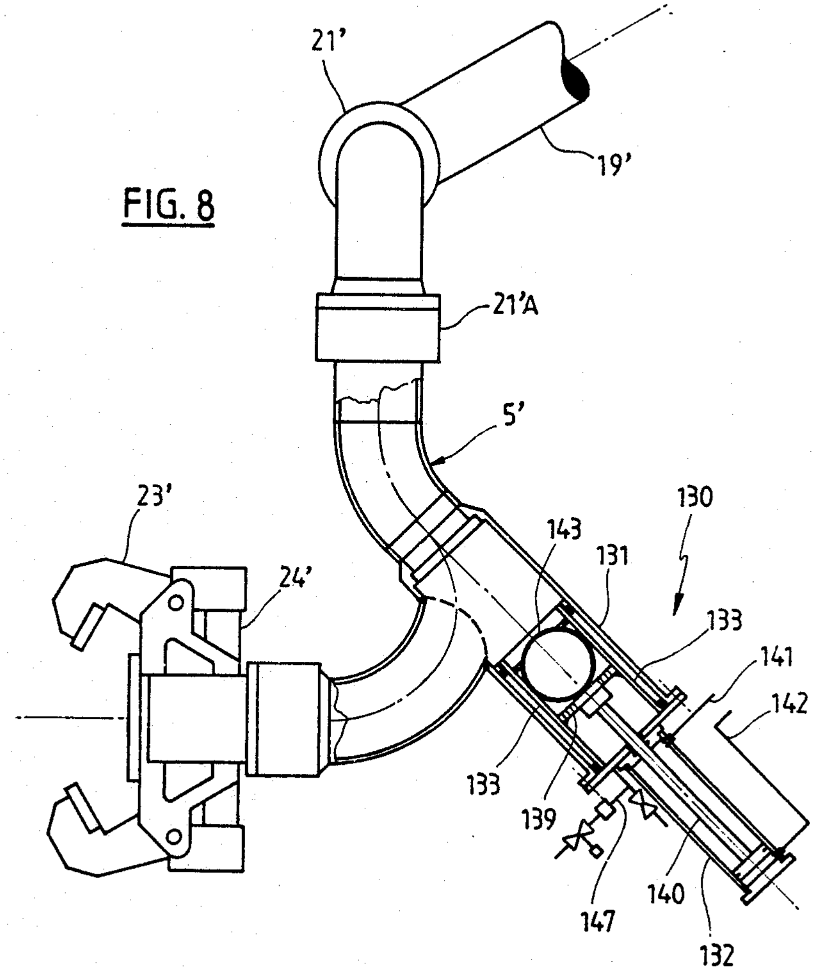
FIG. 8 is an enlarged fragmentary view, partially in section, showing the outboard end of the arm and the purging device mounted thereon.
Figure 9:
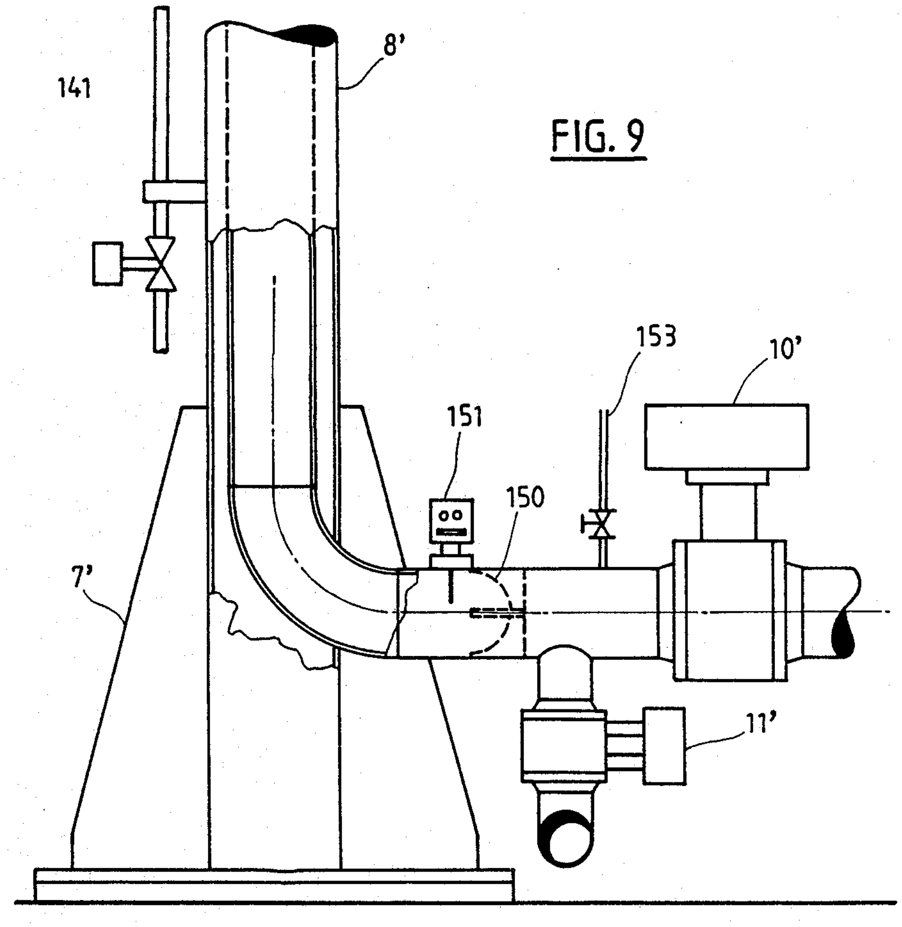
FIG. 9 is an enlarged fragmentary view, partially in section, showing the fixed end of the arm of FIGS. 7 and 8.

The construction of the unloading arm 1' (FIGS. 7–9) is essentially the same as that of the loading arm 1 (FIGS. 1–6), with the reference numbers for identical parts primed. Near the coupling device 23' of the unloading arm 1', that is to say in the upstream area of the arm given the direction of flow of the fluid, is located a purging device 130 (FIG. 8) of the same type as the device 30 or 30' in the previous Figures. A stop member 150 (FIG. 9), similar to the stop member 50, is provided at the base of the arm, that is to say at a downstream area thereof. In an alternative arrangement (not shown) this stop member is situated near the rotary pipe joint 16' (FIG. 7).

A pipe 147 runs along the arm to supply compressed gas to the device 130, and a compressed gas pipe 153 is connected to the pipe section 9' between the stop member 150 and the valve 10' for return propulsion of the pig after an emergency disconnection operation. The emergency disconnection procedure is similarly effected by shutting down the pump (not shown) downstream of the coupling device, operating the actuator 132, injecting the pig 143 and propelling it as far as the stop member 150, while the valve 10' is shut off and the drain valve 11' is opened.

The foregoing description has been given by way of non-limiting example only, and numerous variations may be effected by one skilled in the art without departing from the spirit and scope of the invention. For examples, the coupling (connection/disconnection) unit may be replaced by a so-called "emergency disconnector" device of any type known in the loading arm art, and/or the pig may be of the multiple disc type as available from specialist suppliers.

What is claimed is:

1. An emergency disconnection method for a petroleum product loading/unloading arm, said arm comprising a fixed tubular portion connected to a fixed pipeline, a mobile tubular portion connected to the fixed tubular portion and equipped with a "when-empty" balancing system, and a coupling device adapted to connect the mobile portion to a mobile pipeline subject to fluctuations in position relative to the fixed pipeline, the method comprising, for a given direction of flow of fluid in the arm, shutting off the flow in an upstream area of the arm and, from this shut-off area, purging the fluid contained in the mobile portion of the arm to a downstream area of the arm by propelling a pipe pig means through said mobile portion.

2. A method according to claim 1 wherein, for a flow of fluid from the fixed pipeline to the mobile pipeline, the fluid flow is shut off within the fixed tubular portion and the fluid is purged into the vicinity of the coupling device.

3. A method according to claim 1 wherein, for a flow of fluid from the mobile pipeline to the fixed pipeline, the fluid flow is shut off near the coupling device and the fluid is purged at least as far as the fixed tubular portion.

4. In a petroleum product loading/unloading arm comprising a fixed tubular portion adapted for connection to a fixed pipeline, a mobile tubular portion connected to the fixed portion and equipped with a "when-empty" balancing system, and a coupling device on the mobile portion adapted to connect the arm to a mobile pipeline subject to fluctuations in position relative to the fixed pipeline, the improvement comprising an arm purging device located in an upstream area of the arm relative to the direction of flow of fluid product therethrough, for shutting off the fluid flow into the arm for injecting a pipe pig means into the mobile tubular portion, a pig stop means in a downstream area of the arm adapted to allow the fluid flow to pass through it and to halt movement of the pipe pig means, and a fluid injection system for returning the pipe pig means towards the arm purging device.

5. A loading/unloading arm according to claim 4, wherein the arm purging device is situated in the fixed tubular portion, and the pig stop means is situated near the coupling device.

6. A loading/unloading arm according to claim 5, wherein the arm purging device is situated at the upstream end of the fixed tubular portion of the arm.

7. A loading/unloading arm according to claim 5, wherein the arm purging device is situated near the junction between the fixed and deformable tubular portions of the arm.

8. A loading/unloading arm according to claim 4, wherein the arm purging device is situated near the coupling device and the pig stop means is situated in the arm's fixed tubular portion.

9. A loading/unloading arm according to claim 8, wherein the pig stop means is situated near, and upstream of, a valve for connecting the arm to the fixed pipeline.

10. A loading/unloading arm according to claim 4, wherein the arm purging device comprises a cylindrical housing attached to a pipe elbow in the arm's tubular portion, a sleeve-like sliding bushing in the housing and movable in response to the operation of an actuator between a retracted position in which the bushing is withdrawn from the elbow and an advanced position in which the bushing shuts off fluid flow through the elbow, the bushing being provided with a perforate transverse wall and a pipe pig means, the housing being connectable to a compressed gas supply adapted to inject the compressed gas through the perforate wall and to propel the pipe pig means through the arm's mobile tubular portion.

11. A loading/unloading arm according to claim 10, wherein the bushing comprises retainer means for retaining the pipe pig means in the bushing during normal operation of the arm.

12. A loading/unloading arm according to claim 10, wherein the bushing includes means for facilitating axial movement of the bushing in the housing, and sealing means in the housing with which the sliding bushing comes into contact in its advanced position.

13. A loading/unloading arm according to claim 10 including detector means for detecting when the sliding bushing comes into its advanced position.

14. A loading/unloading arm according to claim 10, including pipe pig detector means in the vicinity of the housing and the pig stop means detectors for detecting passage of the pipe pig means.

15. A loading/unloading arm according to claim 10, wherein the pipe pig means is a sphere.

* * * * *